No. 893,846. PATENTED JULY 21, 1908.
T. C. HOOK & J. H. MITCHELL.
PACKAGE WRAPPING MACHINE.
APPLICATION FILED APR. 22, 1907.
9 SHEETS—SHEET 6.
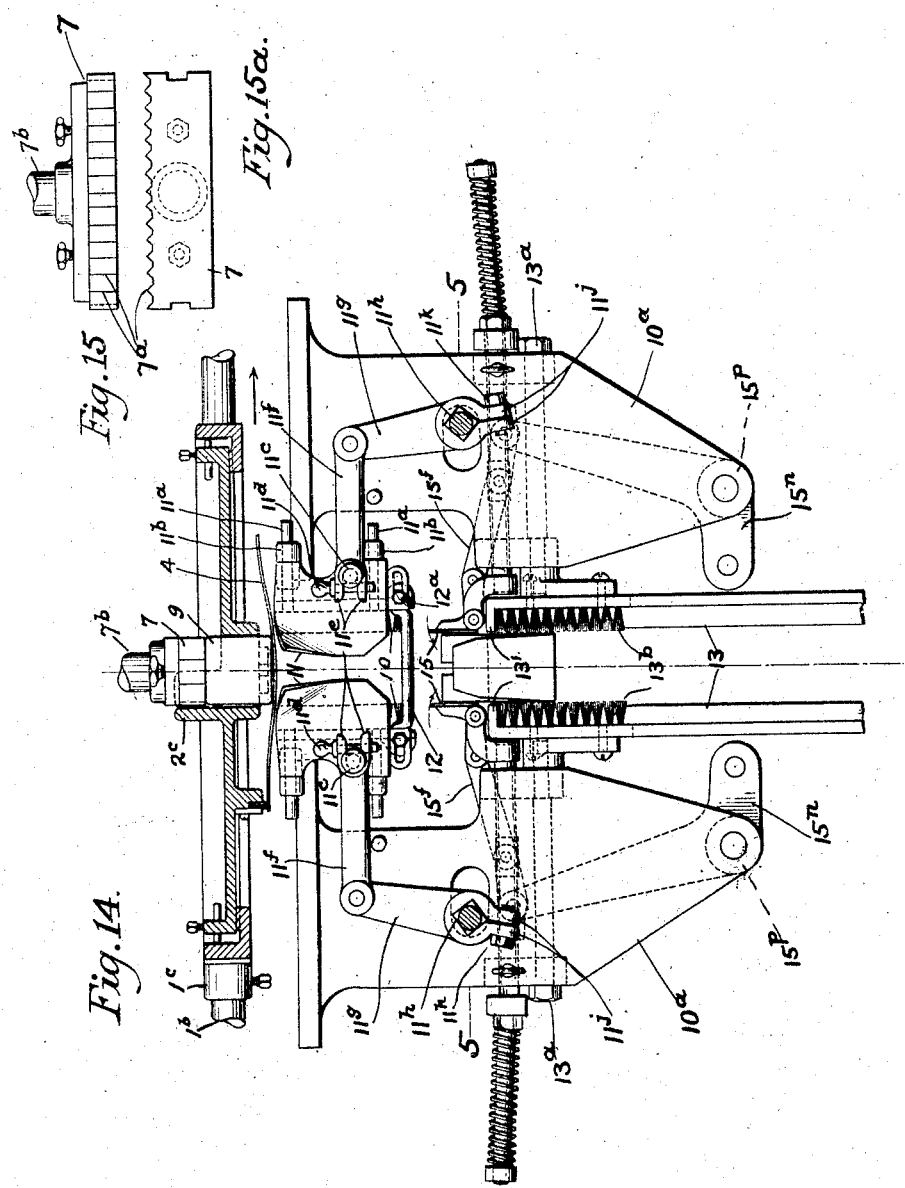
WITNESSES:
INVENTORS
ATTORNEY.

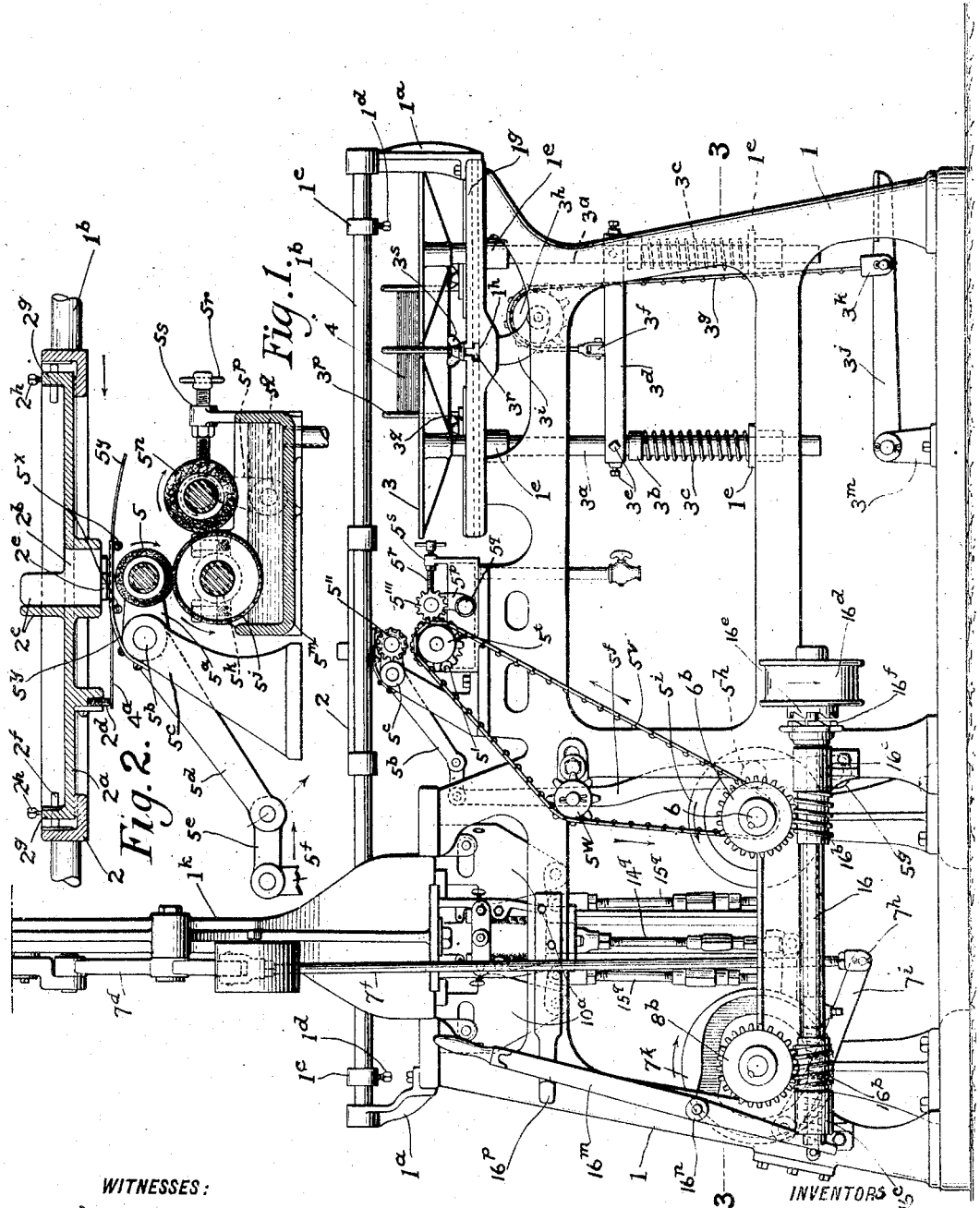

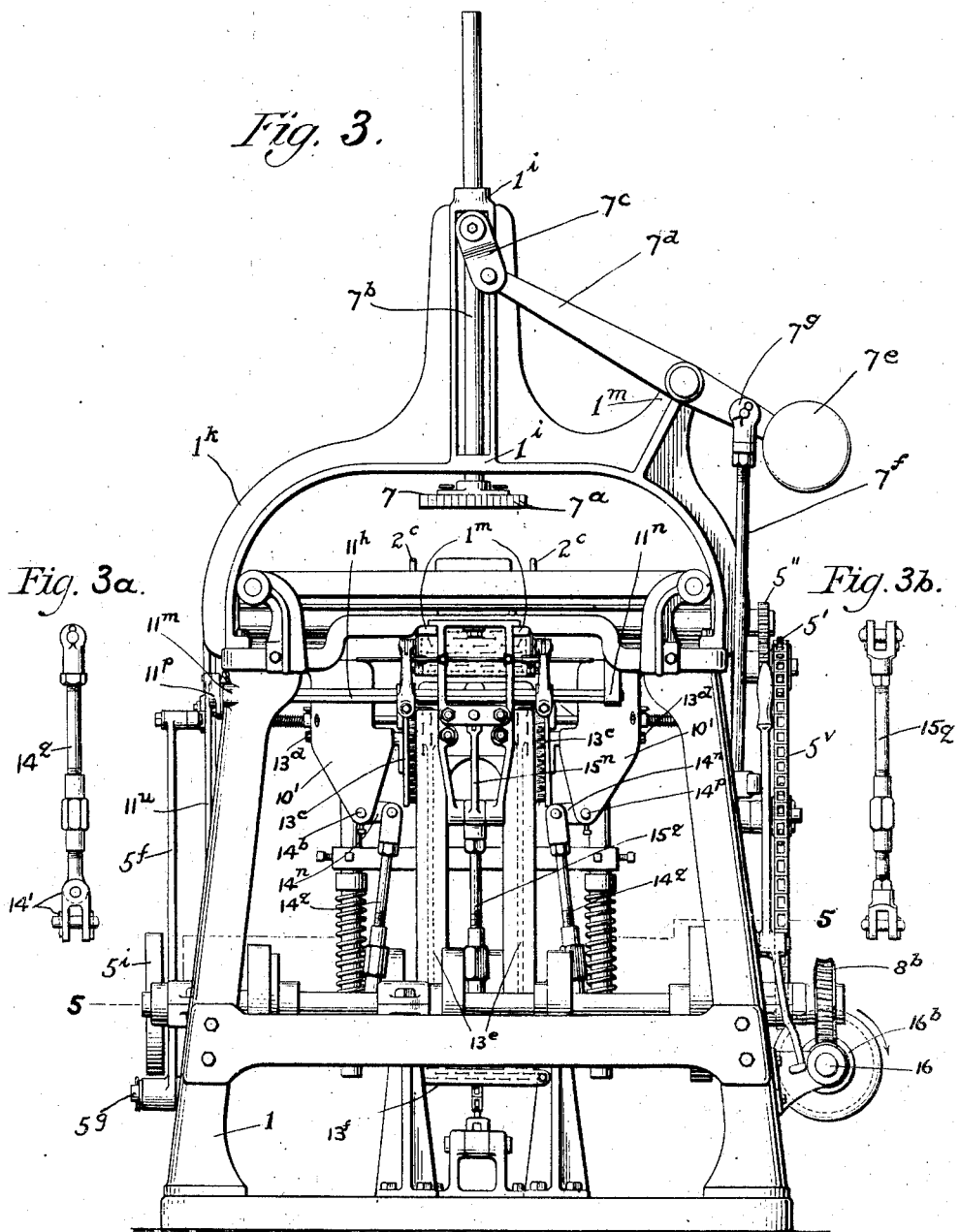

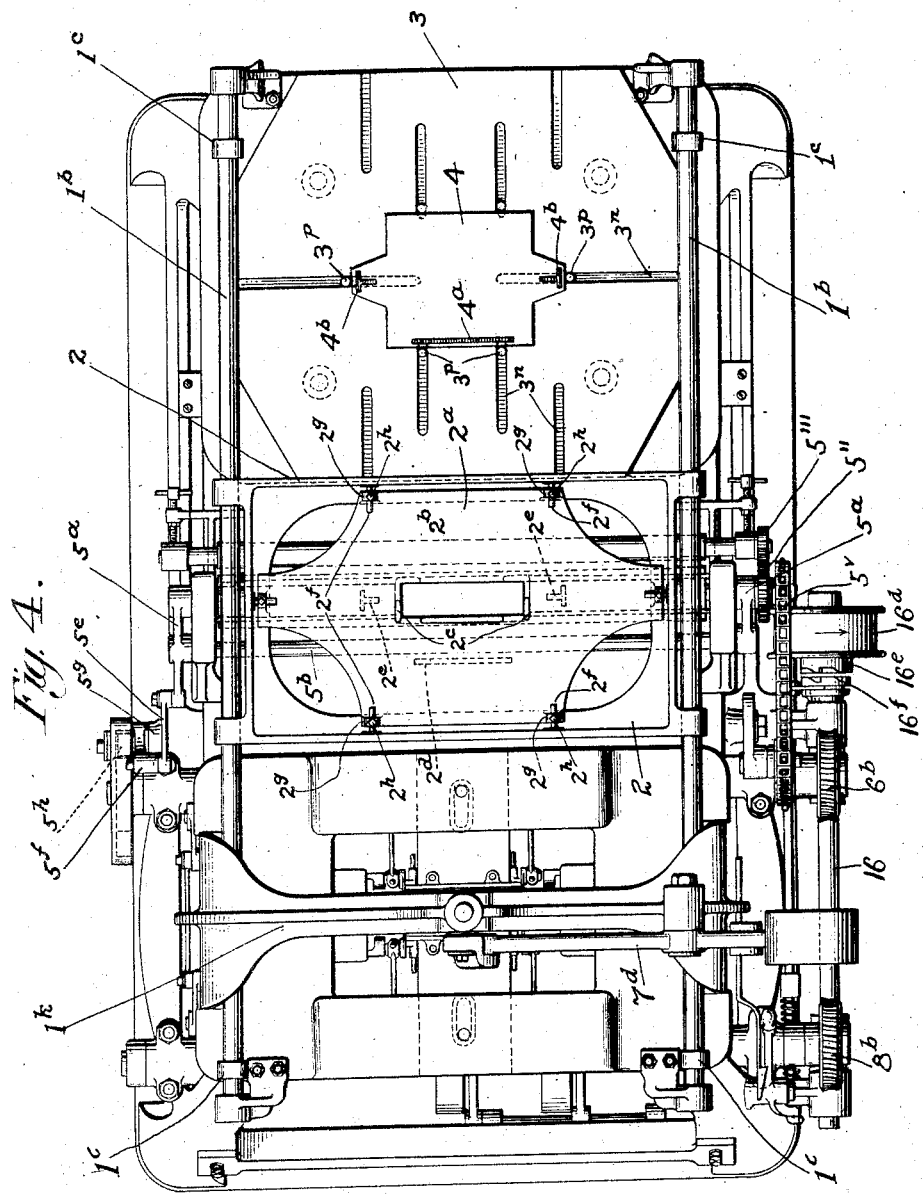

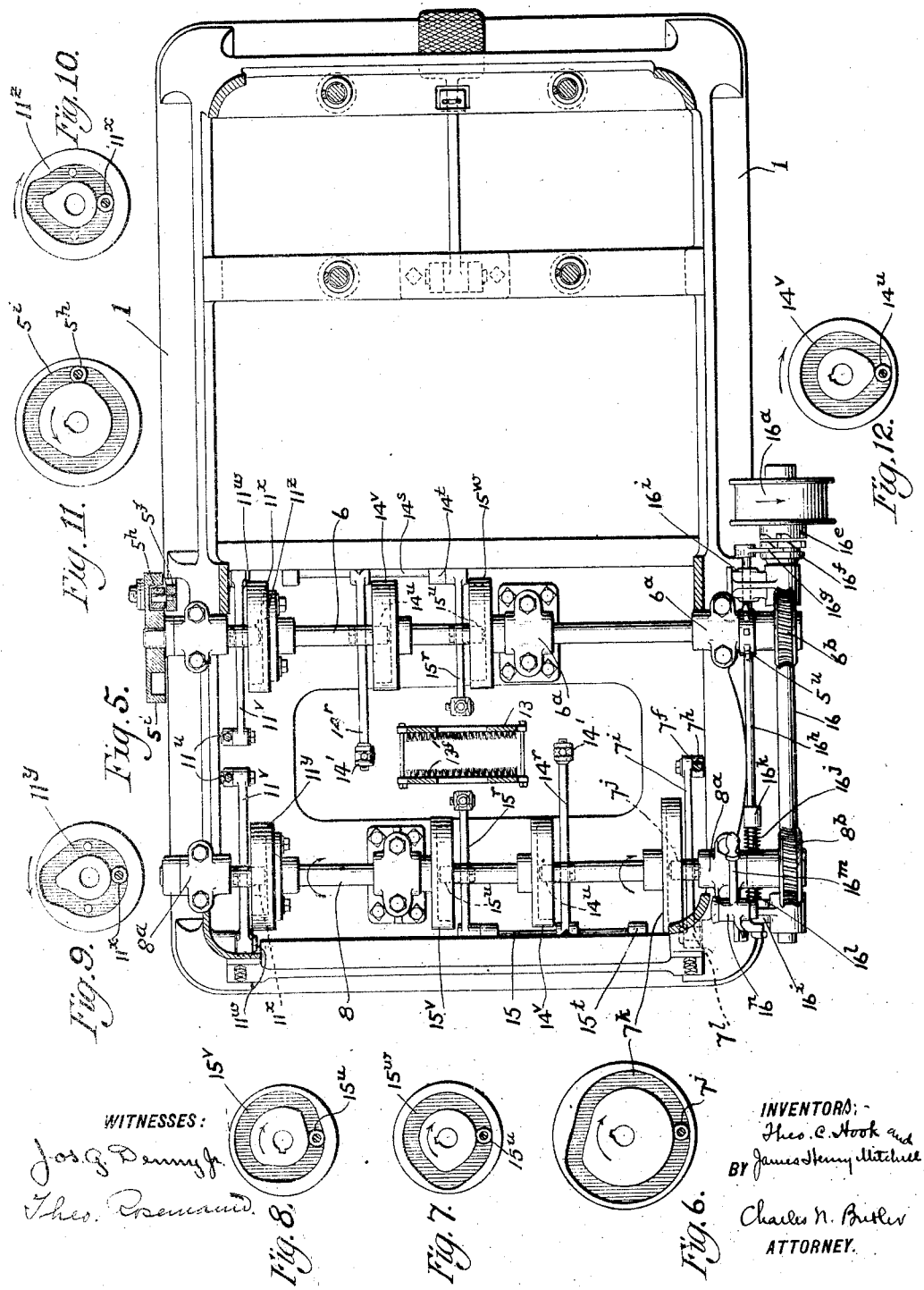

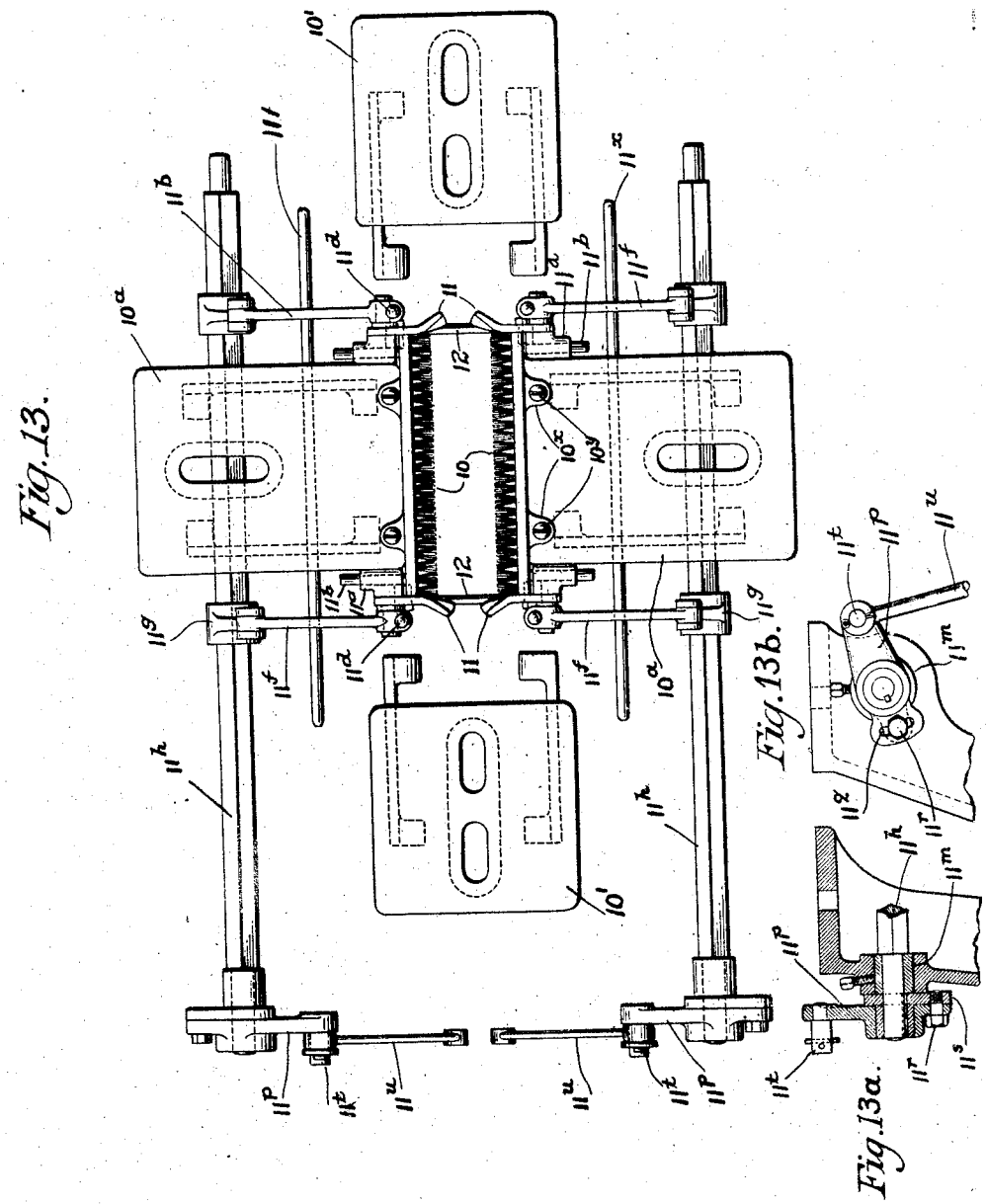

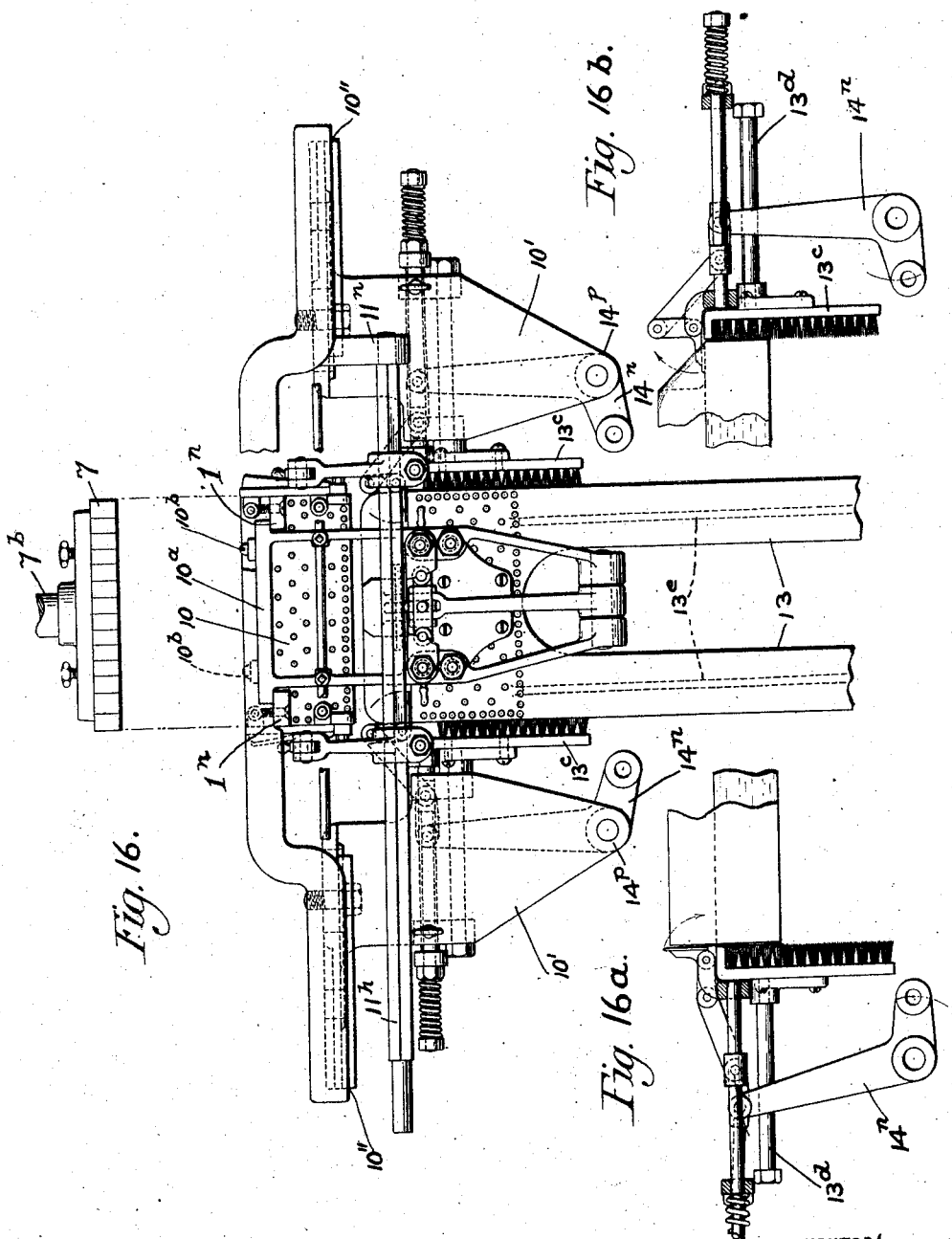

No. 893,846. PATENTED JULY 21, 1908.
T. C. HOOK & J. H. MITCHELL.
PACKAGE WRAPPING MACHINE.
APPLICATION FILED APR. 22, 1907.
9 SHEETS—SHEET 8.
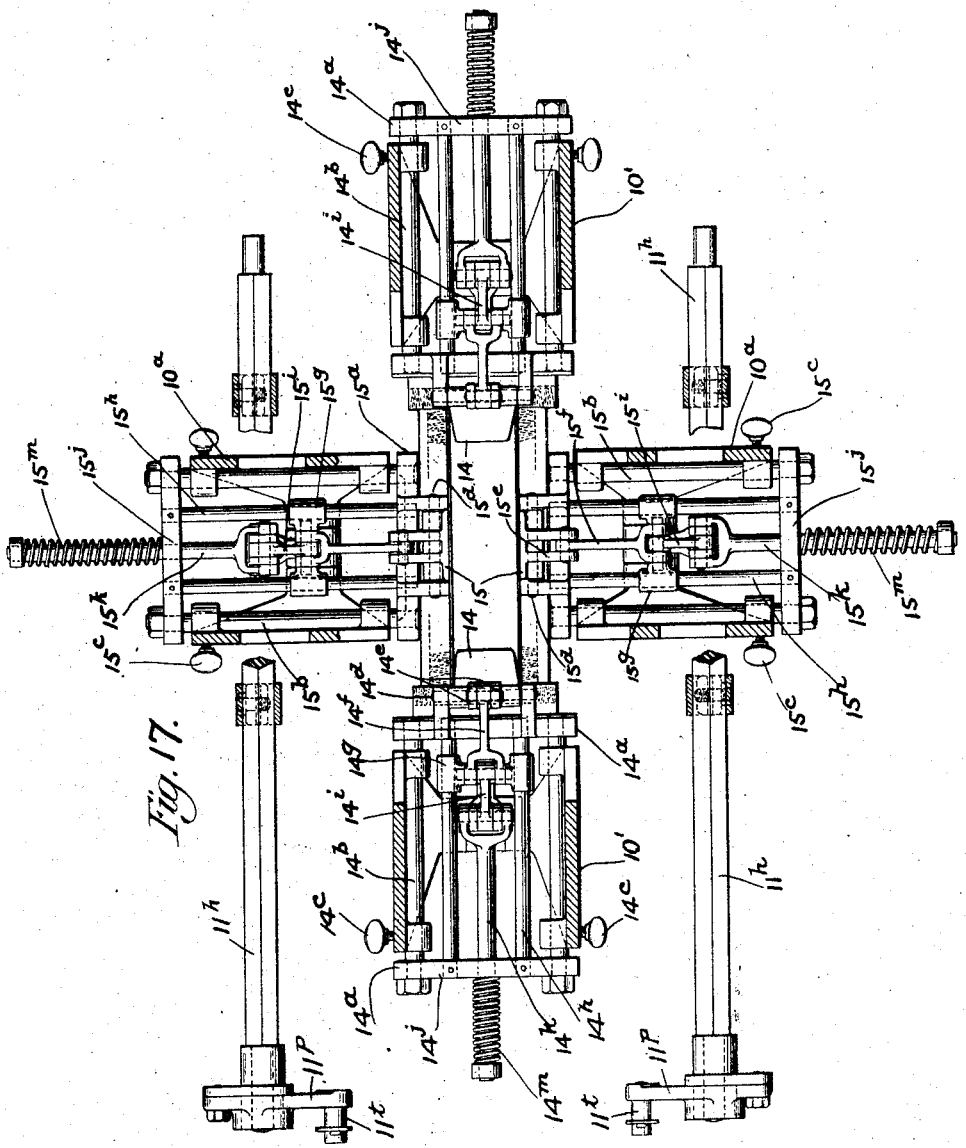
WITNESSES:
INVENTORS:
Theo. C. Hook and
BY James Henry Mitchell
Charles N. Butler
ATTORNEY.

No. 893,846. PATENTED JULY 21, 1908.
T. C. HOOK & J. H. MITCHELL.
PACKAGE WRAPPING MACHINE.
APPLICATION FILED APR. 22, 1907.
9 SHEETS—SHEET 9.
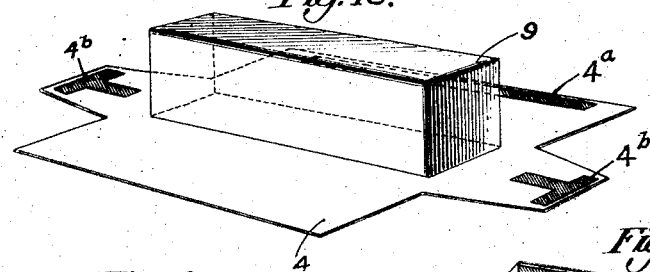
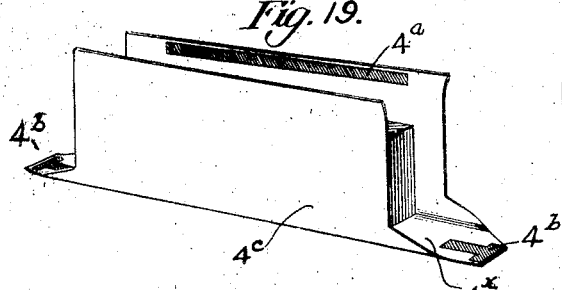
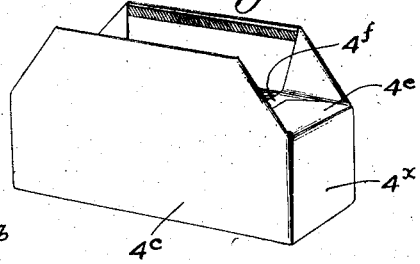
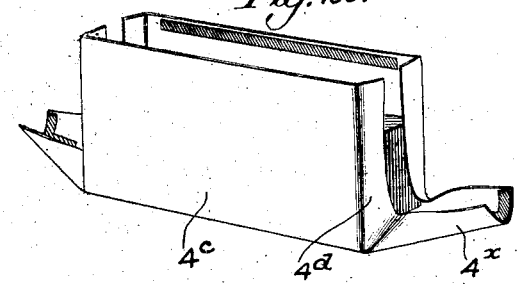
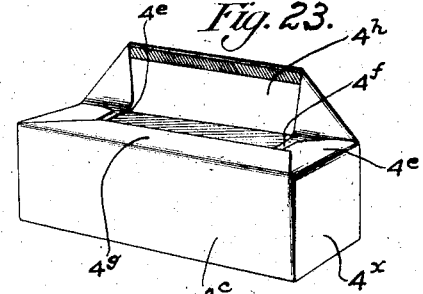
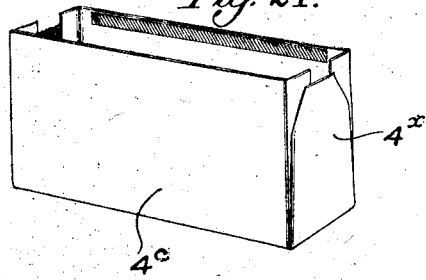
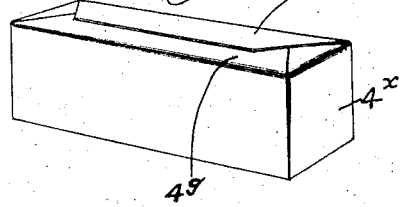
WITNESSES:
Jos. G. Denny Jr.
Theo. Rosemann
INVENTORS:
Theo. C. Hook and
BY James Henry Mitchell
Charles N. Butler
ATTORNEY.

UNITED STATES PATENT OFFICE.

THEODORE C. HOOK AND JAMES HENRY MITCHELL, OF PHILADELPHIA, PENNSYLVANIA; SAID HOOK ASSIGNOR TO SAID MITCHELL.

PACKAGE-WRAPPING MACHINE.

No. 893,846.

Specification of Letters Patent.

Patented July 21, 1908.

Application filed April 22, 1907. Serial No. 369,509.

*To all whom it may concern:*

Be it known that we, THEODORE C. HOOK and JAMES HENRY MITCHELL, citizens of the United States, and residents of the city of Philadelphia, county of Philadelphia, and State of Pennsylvania, have jointly invented certain Improvements in Package-Wrapping Machines, of which the following is a specification.

This invention is an improved package wrapping machine whereby, first, the wrappers are successively gummed, picked up and placed in position for receiving the packages and the first of the several automatic operations by which the wrapping is effected; second, the packages are successively alined and moved with the wrappers on which they are placed so as to be subject to the actions of automatic devices for producing the first series of folds, comprising side folds extending reversely to the direction of movement, edge folds extending transversely to the direction of movement inwardly from the side folds, and end folds extending reversely to the direction of movement with inlaid edge folds overlying the previously formed edge folds and forming therewith gussets connecting the side and end folds; third, the packages with the wrappers thus formed thereon are held in the position to which they have been carried in forming the first series of folds and subjected to automatic operations for producing and fastening the second series of folds, such operations comprising folding inwardly and gumming down the extensions of the end folds and the simultaneously under laid extensions of the first named edge folds, then folding inwardly the extension of one of the side folds, and then folding inwardly and gumming down thereon the extension of the second side fold, the flaps thus secured extending transversely to the sides and ends and closing the package; and, fourth, the packages are held and lightly pressed for a period sufficient to set the wrapper and the gum previously to ejection from the machine.

In the preferred construction, a reciprocating holder carries the blank wrappers into engagement with gumming pads on a reciprocating plate, by which the wrappers are carried to a reciprocating plunger and through which the plunger presses alined packages or cartons so as to carry them with the wrappers to the mechanism for effecting the sequential folding operations, gum being applied to the pads by a roller which is held in their path on their way to receive a wrapper and out of their path as the wrapper is carried to the plunger.

Each carton with its wrapper is carried between a pair of parallel brushes, by which are formed two side folds extending reversely to the direction of movement, and synchronously therewith tucking devices act at right angles to the direction of movement to turn in the edges of the side folds against the ends of the package, while parallel bars, disposed at right angles to the faces of the brushes, fold the ends reversely to the direction of movement, the edges of the end folds being tucked in and form with the edges of the side folds gussets underlying the end folds; by which the first series of folding operations is completed.

In forming the first series of folds, disposed parallel to the direction of movement, the cartons are carried into position for effecting the second sequence of operations, between four brushes respectively parallel to sides and ends, whereby the side and end folds are firmly held against the respective surfaces of the package in its now stationary position in the brush channel.

In forming the second series of folds, tucking devices act against the extensions of the end folds to turn them inwardly and downwardly upon the back of the package where they are gummed fast to the simultaneously tucked in extensions of the edge folds, the corners of the extensions of the side folds being turned inwardly thereby. The end folding devices are withdrawn upon the completion of their folding operation, upon which a folding device acting transversely thereto turns inwardly and downwardly the extension of one of the side folds and is then retracted. Following the last operation, a folding device turns inwardly and downwardly the extension of the second side fold which is gummed upon the inturned extension of the first side fold, the folder being withdrawn upon completing the operation. These extension folds or flaps, thus secured together, extend at right angles to the direction of travel and close the back of the package.

The packages thus wrapped press one upon the other and pass through the brush channel with a step by step movement. The channel permits comparatively free movement while providing a smoothing and setting effect, and the pressure to which the gum flaps are subjected for an appreciable period fixes them.

The construction is of such flexible character that it can be readily adjusted to wrapping cartons of various sizes and shapes.

In the accompanying drawings, Figure 1 represents a side elevation of a machine embodying the invention; Fig. 2 represents an enlarged sectional elevation of the gumming apparatus and sliding stencil plate; Fig. 3 represents an elevation of the end of the machine containing the wrapping devices; Fig. 3$^a$ represents a connecting rod for operating the end folders; Fig. 3$^b$ represents a connecting rod for operating the side folders; Fig. 4 represents a top plan view of the machine; Fig. 5 represents a sectional plan of the machine on the line 5—5 of Fig. 3; Fig. 6 represents a cam for effecting the plunger movement; Fig. 7 represents a cam for effecting the operations which produce the first transverse side fold of the wrapper; Fig. 8 represents a cam for effecting the operations which produce the final transverse side fold of the wrapper; Figs. 9 and 10 represent two adjustable cams for effecting the operations of tucking plates; Fig. 11 represents a cam for operating the gumming roll; Fig. 12 represents a cam for operating the two end folders; Fig. 13 represents on an enlarged scale a plan of the devices for effecting the first set of folding operations; Fig. 13$^a$ represents a detail section of the bearing and connections of the rock shafts of Fig. 13; Fig. 13$^b$ represents an elevation of the rock arm and connections shown in Fig. 13$^a$; Fig. 14 represents a sectional view of the devices for effecting the first and second series of folding operations with the end folders for the second series removed; Fig. 15 represents a side view and Fig. 15$^a$ represents a plan of the plunger; Fig. 16 represents a side elevation of the folding devices for effecting the first and second series of folding operations; Fig. 16$^a$ represents mechanism for holding end folds and turning the extensions thereof transversely, in the second series of operations, the folding plate being in the initial folding position; Fig. 16$^b$ represents mechanism similar to that shown in Fig. 16$^a$ with the folding plate in the final folding position; Fig. 17 represents a sectional plan view of the mechanism for effecting the second series of folding operations; and Figs. 18 to 24 inclusive represent the respective stages in folding the wrapper upon the package.

As shown in Figs. 1 to 4 inclusive, the machine frame 1 is provided with the brackets 1$^a$ which support the parallel guide bars 1$^b$. A frame 2, carrying the stencil plate 2$^a$, slides on the guide bars between the stops 1$^c$ for limiting the movement of the frame, the stops being adjustable on the bars by means of the set screws 1$^d$ to vary the limits of the frame's reciprocations. The plate is provided with the aperture 2$^b$ for passing the packages, the projections 2$^c$ for guiding the packages, and the pads 2$^d$ and 2$^e$ for gumming and carrying the wrappers. To permit change and adjustment of the plate, for accommodation to different forms of packages and wrappers, the frame carries the studs 2$^f$ which are engaged in lugs 2$^g$ on the plate by set screws 2$^h$.

A table 3 is carried by the rods 3$^a$ which reciprocate in bearings 1$^e$ in the frame, the rods having thereon collars 3$^b$ between which and the lower bearings 1$^e$ are disposed the springs 3$^c$ for balancing the table. A yoke 3$^d$ is fixed to the rods by set screws 3$^e$ and has a connection 3$^f$ to a chain 3$^g$. The chain passes over a wheel 3$^h$ journaled in bearings 3$^i$ and is fastened to a treadle 3$^j$ by a connection 3$^k$, the treadle being fulcrumed on the bearing 3$^m$. The table is provided with the slots 3$^n$ in which are disposed the adjustable guide pins 3$^p$ carried by slides 3$^q$ supported by the frame plate 1$^g$. The plate has therein undercut slots 1$^h$ which engage the heads of bolts 3$^r$ passing through the slides and engaged by the nuts 3$^s$ for clamping the slides.

The pins are adjusted as required for the form and the desired position of the package of wrappers 4, which are to be held so that when the table is elevated, by the treadle acting through the chain and yoke on the supporting bars, the properly positioned pads on the stencil plate will gum and hold the topmost wrapper, the pad 2$^d$ applying the longitudinal strip of gum 4$^a$ along one side of the wrapper and the pads 2$^e$ applying the T-shaped strips 4$^b$ to the wrapper ends.

The gum is applied to the pads by a roll 5 having its ends journaled in arms 5$^a$ fixed to a shaft 5$^b$ which is journaled in the bearings 5$^c$. The roll is elevated so that it will engage the pads in the movement of the stencil mechanism along the guide bars to receive a wrapper, and is lowered to receive a supply of gum and out of the path of the wrappers in the reverse movement of such mechanism. To effect this oscillating movement, an arm 5$^d$ is fixed to the shaft 5$^b$ (as by making it integral with one of the arms 5$^a$) and is pivotally connected to a link 5$^e$, which is pivotally connected to a lever 5$^f$ having a fulcrum 5$^g$ on the frame. The lever has thereon a roller 5$^h$ which engages a cam 5$^i$ fixed on the shaft 6 journaled in the bearings 6$^a$ (Figs. 5 and 11).

To gum the roll 5, it makes contact, in its lower position, with a roll 5$^j$ having its ends journaled in bearings 5$^k$ and revolving in a gum font 5$^m$. The roll 5$^j$ revolves in the direction of the arrow in contact with a doctor roll $5^n$ having its ends journaled in links $5^p$ movable on the bearings $5^q$. The roll $5^n$ is withdrawn or its pressure regulated by screws $5^r$ which are movable in the stationary bearings $5^s$ and engage the links (Fig. 2). The roll $5^j$ has the gear $5'$ fixed thereto which engages the gear $5''$ fixed to the roll 5 and a gear $5'''$ fixed to the roll $5^n$. These rolls are revolved through a sprocket wheel $5^t$ fixed to the roll $5^j$, a sprocket wheel $5^u$ fixed on the shaft 6 and a chain $5^v$ passing over the wheels, the chain being kept taut by a usual tightening mechanism $5^w$ (Figs. 1 and 5).

To prevent any possible contact of the wrapper 4 with the roll 5 as it is carried thereover by the stencil mechanism, it is passed over guide bars $5^x$ which are held parallel to and above the roll, in its lower position, by the members $5^y$ fixed to the bearings $5^c$. (Figs. 1 and 2).

The stencil mechanism carries the wrappers 4 held by the pins $3^p$ under and so that its aperture $2^b$ registers with the plunger 7, the latter having corrugated edges $7^a$ to prevent adhesion of the gummed parts of the wrapper in folding. The plunger is fixed to a rod $7^b$ which reciprocates in bearings $1^i$ of the yoke $1^k$ (Figs. 1, 3, and 4). To reciprocate the plunger its rod is pivotally connected to a link $7^c$ which is pivotally connected to a lever $7^d$, the lever being fulcrumed on the bearing $1^m$ and having a counterpoise $7^e$ for balancing the plunger operating mechanism. The lever is oscillated by a rod $7^f$ having a pivotal connection $7^g$ therewith and a pivotal connection $7^h$ with a lever $7^i$ which rocks on a fulcrum $7^l$. The lever $7^i$ is provided with a roller $7^j$ by which it is engaged to and rocked by a cam $7^k$ fixed on a shaft 8, the shaft being journaled in the bearings $8^a$ (Figs. 1, 3, 4, 5, and 6).

When the stencil mechanism has carried forward a wrapper 4 to position for registration with the plunger 7, a package 9 is placed in the aperture or throat $2^b$, with the aid of the guides $2^c$, and occupies with reference to the wrapper the relation shown in Fig. 18. The descent of the plunger carries the box downwardly between a pair of vertically disposed parallel brushes 10 fixed to brackets $10^a$, which are adjustable in the ways $1^n$ of the machine frame to accommodate various sizes of packages (Figs. 1, 3, 14 and 16). The brushes fold back the sides $4^c$ of the wrapper upon the sides of the package as shown in Fig. 19. In sequence with this movement of the package and the folding of the sides of the wrapper, the edges $4^d$ of the sides are turned in as shown in Fig. 20. This is effected by the inward movement of the tucker plates 11 having the slides $11^a$ which reciprocate in the guides $11^b$ fixed to the brushes 10. (Figs. 13 and 14). To reciprocate the tucker plates, pins $11^c$ thereon are engaged by pins $11^d$ and yokes $11^e$ of links $11^f$ which are pivotally connected to arms $11^g$ fixed to rock shafts $11^h$. The arms have the bifurcations $11^j$ with the bolts $11^k$ passed therethrough to engage them adjustably on the shafts so as to permit variation in the action or adjustment of the tucking mechanism to packages of various sizes. (Figs. 3 and 14.)

The rock shafts, journaled in the bearings $11^m$ and $11^n$, have thereon the arms $11^p$ containing the slots $11^q$. Bolts $11^r$ are passed through the slots into flanges $11^s$ fixed to the shafts, by which the positions of the arms may be adjusted to vary the action of the tuckers operated therethrough. (Figs. 13, $13^a$, and $13^b$). Pins $11^t$ on the arms engage links $11^u$ pivotally connected to levers $11^v$ which are fulcrumed on bearings $11^w$. These levers are rocked by the engagements of the rollers $11^x$ thereon with the oppositely formed cams $11^y$ and $11^z$ fixed in adjustable relation to the respective shafts 6 and 8 (Figs. 5, 9, 10, 13, $13^a$ and $13^b$). The form of the cams provides a quick inward movement of the tucker plates from their outer position beyond the faces of the brushes with a dwell in their inner positions to set the edge folds, the tuckers acting after the brushes have formed the side folds and holding the tucks as the plunger moves the package slowly thereby.

In sequence the operations of the tucker plates, the ends $4^x$ of the wrapper are engaged and folded reversely to the direction of movement of the package, from the form shown in Fig. 20 to that shown in Fig. 21, by the rounded and polished folding bars 12 firmly secured to the lower parts of the blocks of the brushes 10 by the bolts $12^a$. The package, having the first series of wrapper folds thus formed in planes parallel to the direction of movement, passes from the first channel, formed by the first series of folding devices, into the continuation of the channel provided by the bars 13, engaged by bolts $13^a$ to the brackets $10^a$ and carrying the brushes $13^b$, and the brushes $13^c$ engaged by bolts $13^d$ to the brackets $10'$. The package is guided to the brushes by the then vertically disposed plates 14 and 15 and the flanges $13'$ projecting inwardly from the bars, and is moved by the plunger to a position such that its top is flush with the top of the flanges and with the faces of the plates in their horizontal position. Here it is held stationary in the embrace of the brushes during the quick reverse movement of the plunger; the cam for operating the plunger providing a quick action therefore in its reverse and forward movement to the stencil throat in order that it may move the package slowly through the remainder of its course (Figs. 14 and 16). The second series of folding operations for finally closing the wrapper are performed, with the package thus held by the brushes 13$^a$, by the inward and downward movements of the simultaneously acting folders 14 and thereafter the inward and downward movements of the sequentially acting folders 15 (Figs. 14 to 17).

The mechanism for operating the folders 15 and 14 are respectively supported by the pair of brackets 10$^a$ adjustable in the ways 1$^m$ and the transversely disposed pair of brackets 10' adjustable in the ways 10''. These mechanisms comprise the frames 14$^a$, 15$^a$, with guides 14$^b$, 15$^b$, adjustable in and fixable to the supporting brackets by the screws 14$^c$, 15$^c$; whereby adjustment may be effected in the positions of the folding and guiding or channel members carried by the frames to accommodate various sizes of packages. Each of the folders 14 and 15 has the respective pivotal connections 14$^d$, 15$^d$, with the frames and the angle arms 14$^e$, 15$^e$, pivotally connected to the links 14$^f$, 15$^f$; the links being pivotally connected to the slides 14$^g$, 15$^g$, which reciprocate on the frame guides 14$^h$, 15$^h$, to oscillate the folders. Links 14$^i$, 15$^i$, are pivotally connected to the respective slides 14$^g$, 15$^g$; to rods 14$^k$, 15$^k$, reciprocating in the frame members 14$^j$, 15$^j$, under control of the coiled springs 14$^m$, 15$^m$ thereon, and to the crank levers 14$^n$, 15$^n$, fulcrumed on the bearings 14$^p$, 15$^p$, of the brackets. The springs act through the frames and the rods on which they are placed to quickly retract and hold the folders 14 and 15 in the vertical position, where they are stopped; they serve the further purpose of taking up lost motion from wear or otherwise. The short arms of the crank levers are pivotally connected to the ends of the respective rods 14$^q$, 15$^q$, which are pivotally connected at their opposite ends to the respective levers 14$^r$, 15$^r$; the rods 14$^q$ having universal joints 14' for connecting them with the levers 14$^r$. The levers are fulcrumed by means of the rods 14$^s$, 15$^s$, and the bearings 14$^t$, 15$^t$ so that they can be moved laterally for accommodation of the mechanisms which they operate to various sizes of packages, and are rocked by the engagements of the rollers 14$^u$, 15$^u$ which they carry with the cams 14$^v$, 15$^v$, 15$^w$, fixed to the shafts 6 and 8, on which the cams 14$^v$ are adjustable for variation to different sizes of package (Figs. 1, 3, 3$^a$, 3$^b$, 5, 7, 8, 11, and 12). It will be understood that these cams are so formed and placed on the shafts, by which they are simultaneously revolved that the end folders 14 act simultaneously and quickly to fold the end flaps 4$^e$ with the underlaid edge flaps 4$^f$, pressing the one down upon the others, so that they are glued together in the form shown in Fig. 22. Then, as the end folders are retracted, one of the side folders 15 tucks and presses down the corresponding side flap 4$^g$ as shown in Fig. 23. And then as the first side folder is retracted the second side folder 15 tucks and presses down the final side flap 4$^h$, the latter being glued down to close the package as shown in Fig. 24. Each of the cams gives the proper dwells to the folder operated thereby so that the folders are held vertically and guide the package into position for effecting this last series of folding operations, and so that the several folders are held down for a sufficient period of time to set the flaps which they fold. The flanges 13' coact with the folders in forming and fixing the flaps, holding the tops of the side folds up to the sides of the package and forming angles with the plates as they press upon the top of the package, whereby an angular set corresponding to the package angles is given to the side and top folds.

To operate the shafts 6 and 8 they have fixed thereon the respective oppositely pitched worm wheels 6$^b$ and 8$^b$ which are engaged by worms 16$^a$ and 16$^b$ on a shaft 16 journaled in bearings 16$^c$, the revolution of the shaft 16 revolving the shafts 6 and 8 in opposite directions. The shaft 16 is driven by a pulley 16$^d$ normally loose thereon and fixable thereto, the pulley having a clutch member 16$^e$ fixed thereto engageable by a clutch member 16$^f$ longitudinally movable on and fixed in revoluble relation to the shaft. The clutch member 16$^f$ is shifted by an engaging yoke 16$^g$ relatively to which it revolves and a shifter bar 16$^h$ to which the yoke is fixed, the bar reciprocating in the ways 16$^i$. A spring 16$^j$ is disposed between the collar 16$^k$ fixed on the bar 16$^h$ and the bearing 16$^l$ to throw the member 16$^f$ into engagement with the member 16$^e$. A lever 16$^m$ having the fulcrum 16$^n$ engages the bar 16$^h$ to disengage the clutching members, which are held out of engagement by a spring catch 16$^p$ which engages the lever.

When the package has been finally wrapped and the folders returned to their initial positions, by the mechanism described, it is pushed down in the brush channel by a following package through a repetition of the described operations. The bars 13 are provided with the guides 13$^e$ for the packages and the bottom brushes 13$^f$ for providing frictional resistance, the top and bottom brushes affording the necessary friction to retain the packages in the way thus formed so that a slight pressure is required from the plunger to eject them one by one, the time and pressure sufficiently fixing the glue so that the wrappers will not spring open.

It will be understood that the mechanism described is entirely flexible and readily changeable for accommodation to various sizes of packages. The brushes 10 are readily detached from the brackets 10$^a$ to which they are engaged by ears 10$^x$ thereon and screws 10$^y$, the brackets being adjustable as described. The tucker plates 11 can be removed by withdrawing the pins 11$^d$ from the links 11$^i$ (which are supported on the rods 111 while effecting the change), the mechanism for operating the tucker plates being changeable as previously described. The bars 12 are readily detachable and changeable by means of the bolts 12$^a$ for holding them. The folding plates 14 and 15 are readily changeable by reason of their pin connections. The bars 13 and the brushes 13$^b$, 13$^c$ and 13$^f$ are wholly supported by detachable bolts and adjustable brackets as described. The mechanism permits the tucker plates to be operated in sequence by a proper relative adjustment of the arms 11$^f$ on the rock shafts 11$^h$. This is sometimes desirable as a set of boxes is occasionally found in which the sides are not square when it is preferable to tuck in the edge folds on one side and hold them previously to tucking in the edge folds of the opposite side, to permit the wrapper and box to properly adjust their relations.

Having described our invention, we claim:—

1. In a package wrapping machine, a wrapper holder, mechanism for carrying a wrapper from said holder to position for receiving a package, said mechanism having means for guiding said package to said wrapper carried thereby, a set of devices for moving said package and forming a series of folds parallel to the direction of movement, and a second set of devices for forming a second series of folds transverse to said first series of folds.

2. In a package wrapping machine, a reciprocating wrapper holder, reciprocating mechanism for carrying wrappers from said holder to position for receiving packages, said mechanism having means for guiding said packages to said wrappers carried thereby, a device for moving said packages, a set of devices for forming a set of folds, and a subsequently acting set of devices for forming a second set of folds.

3. In a package wrapping machine, a wrapper holder comprising a reciprocating table and devices for positioning wrappers thereon, a reciprocating frame having means for engaging wrappers carried by said table and means for guiding packages to wrappers engaged thereby, reciprocating mechanisms for folding said wrappers on said packages, and reciprocating mechanism for moving said packages and wrappers from said frame to said folding mechanisms.

4. In a package wrapping machine, a vertically reciprocating wrapper holder, a horizontally reciprocating device having means for holding a wrapper and an aperture for passing a package thereto, and mechanism by which said wrapper is folded about said package.

5. In a package wrapping machine, a table having means for moving it, a stencil plate with an aperture therein and gumming pads thereon, a set of folding devices and means for guiding said stencil plate between said table and folding devices.

6. In a package wrapping machine, a table, adjustable wrapper positioning devices relatively to which said table is movable, guide rods upon which said table is supported, a lever, and means whereby said table is elevated by said lever.

7. In a package wrapping machine, guiding means, a frame movable on said guiding means, devices carried by said frame for applying an adhesive to and holding a wrapper, and means connected with said frame for registering a package with the wrapper held by said devices.

8. In a package wrapping machine, a pair of guide rods, a plate with an aperture therein for passing packages, and gumming pads thereon, for holding wrappers; means whereby said plate is movable on said guide rods, and a wrapper holding device reciprocating transversely to the direction of movement of said plate.

9. In a package wrapping machine, a font for an adhesive, a roller having its surface revoluble in said font, a doctor roller engaging said first roller, a reciprocating frame having an aperture therein and a pad or pads thereon, a third roller, means for moving said third roller into and out of engagement with said first roller and said pad or pads, means for holding wrappers and engaging them with said pad or pads, and means for pushing articles through said aperture against wrappers engaged by said pad or pads.

10. In a package wrapping machine, a pair of brushes, tucking devices movable transversely to said brushes, and means for carrying a package and wrapper continuously between said brushes and across the path of movement of said tucking devices, said tucking devices being timed to act during the movement of said package and wrapper.

11. In a package wrapping machine, a set of stationary devices conforming to the sectional contour of a package to be wrapped, reciprocating tuckers, and means for carrying a package with a wrapper continuously past said devices and tuckers said tuckers being timed to act during the movement of said package, whereby said wrapper is formed into a series of folds lying in planes parallel to the direction of movement of said package.

12. In a package wrapping machine, a pair of parallel folding devices, a second pair of parallel folding devices disposed transversely to and near the end of said first named devices, tucker plates reciprocating parallel to said second pair of folding devices, and means for moving a package with a wrapper continuously between said devices and across the path of movement of said plates, said plates being actuated simultaneously with the movement of said package and wrapper past them, said devices forming main folds extending reversely to the movement of said package, and said plates tucking in the edges of said main folds.

13. In a package wrapping machine, a set of stationary folding devices and a set of tuckers forming a way for guiding a package, mechanism for holding a wrapper over and registering a package with said way, and a plunger for pushing said package and wrapper through said way.

14. In a package wrapping machine, a pair of brushes, a pair of bars disposed transversely to said brushes, a set of tuckers reciprocating transversely to said brushes, mechanism for holding a wrapper and guiding a package, and a reciprocating plunger moving said package and wrapper from said holding device so as to be acted upon by said brushes, bars and tuckers.

15. In a package wrapping machine, mechanism for moving a package and wrapper, means for forming simultaneously with the movement of said package and wrapper four main wrapper folds and four gusset folds all extending in the same direction, subsequently acting means for folding down on a surface of the package the extensions of two oppositely disposed main folds, means for folding down on said folded extensions the extension of a third main fold, and means for folding down on said extension folds the extension of the fourth main fold.

16. In a package wrapping machine, a set of stationary devices for folding a wrapper on a moving package, a set of reciprocating devices for tucking simultaneously with the movement of said package the ends of folds formed thereon, and a set of oscillating devices for folding extensions of folds formed on said package.

17. In a package wrapping machine, a set of folders comprising a pair of brushes, a pair of bars disposed transversely to said brushes, and a set of reciprocating tuckers forming a way, in combination with a set of oscillating folding devices, means for holding a package and wrapper in position to be acted upon by said devices, and mechanism for moving said package and wrapper through said way into said holding means.

18. In a package wrapping machine, a pair of devices oscillating on parallel axes to form oppositely extending folds on a side of said package, and a second pair of devices oscillating on parallel axes to form oppositely extending folds on said side of said package said oscillating devices forming a way for guiding said packages.

19. In a package wrapping machine, a channel provided with brushes for smoothing and holding wrapper folds on a package moving therethrough, in combination with oscillating devices for folding extensions of said folds against the rear side of said package relatively to its direction of movement through said channel.

20. In a package wrapping machine, a channel provided with brushes and flanges at the entrance to said brushes, in combination with folding plates pivoted relatively to said flanges and adapted for forming angles therewith.

21. In a package wrapping machine, a channel having mechanism for guiding and holding a package, in combination with folding plates pivoted relatively to said mechanism and adapted for guiding a package thereto.

22. In a package wrapping machine, a channel, brushes within said channel, guiding and holding mechanism at the entrance to said brushes, and folding plates pivoted relatively to said mechanism, said plates forming a guide to said mechanism when open and angles conforming to wrapper angles to be formed when closed.

23. In a package wrapping machine, a set of stationary folding brushes with guides thereon, a set of reciprocating tucker plates movable on said guides, rock shafts extending transversely to the planes of movement of said plates and mechanisms connecting said rock shafts with said plates.

24. In a package wrapping machine, mechanism for folding wrappers upon packages, in combination with a channel to which said wrapped packages are delivered, said channel having brushes at the inlet thereto for frictionally engaging the packages to smooth and set their wrappers, brushes removed therefrom and engaging said packages so as to provide resistance against their free movement through said channel, and means for guiding said packages from said first to said second brushes.

25. In a package wrapping machine, a frame, a bracket having a sliding engagement with said frame, a tucker having a sliding engagement with said bracket, a link pivotally connected with said tucker, a rock shaft, an arm pivotally connected to said link and fixed to said rock shaft, and means for rocking said shaft.

26. In a package wrapping machine, a frame, a bracket having a movable engagement with said frame, a brush supported by said bracket, a tucker having means for connecting it in reciprocating relation to said brush, a link pivotally connected to said tucker, a rock shaft, an arm fixed to said shaft and pivotally connected to said link, and mechanism for rocking said shaft.

27. In a package wrapping machine, a frame, a bracket having a sliding engagement with said frame, a frame having a sliding engagement with said bracket, a hinged folder connected with said sliding frame, and mechanism for oscillating said folder.

In testimony whereof we have hereunto set our names this 20th day of April, 1907, in the presence of the subscribing witnesses.

THEODORE C. HOOK.
JAMES HENRY MITCHELL.

Witnesses:
CHARLES N. BUTLER,
M. B. ELWERT.